United States Patent
Kazakov et al.

(10) Patent No.: US 11,521,342 B2
(45) Date of Patent: *Dec. 6, 2022

(54) RESIDENCY MAP DESCRIPTORS

(71) Applicant: ADVANCED MICRO DEVICES, INC., Santa Clara, CA (US)

(72) Inventors: Maxim V. Kazakov, San Diego, CA (US); Mark Fowler, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,140

(22) Filed: Apr. 14, 2021

(65) Prior Publication Data

US 2021/0343066 A1 Nov. 4, 2021

Related U.S. Application Data

(63) Continuation of application No. 16/723,232, filed on Dec. 20, 2019, now Pat. No. 10,991,146, which is a (Continued)

(51) Int. Cl.
*G06T 15/04* (2011.01)
*G06T 15/00* (2011.01)

(52) U.S. Cl.
CPC ............ *G06T 15/04* (2013.01); *G06T 15/005* (2013.01); *G06T 2210/36* (2013.01)

(58) Field of Classification Search
CPC .... G06T 15/04; G06T 2210/36; G06T 15/005
See application file for complete search history.

(56) References Cited

U.S. PATENT DOCUMENTS 5,760,783 A 6/1998 Migdal et al.
6,791,561 B1 * 9/2004 Dawson ................. G06T 15/04
345/582

(Continued)

FOREIGN PATENT DOCUMENTS

JP 2009099098 A 5/2009
KR 10-2013-0115090 A 10/2013

OTHER PUBLICATIONS

International Preliminary Report on Patentability dated Jul. 27, 2021 for PCT/US20/14060, 5 pages.

(Continued)

*Primary Examiner* — Phi Hoang

(57) ABSTRACT

A processor receives a request to access one or more levels of a partially resident texture (PRT) resource. The levels represent a texture at different levels of detail (LOD) and the request includes normalized coordinates indicating a location in the texture. The processor accesses a texture descriptor that includes dimensions of a first level of the levels and one or more offsets between a reference level and one or more second levels that are associated with one or more residency maps that indicate texels that are resident in the PRT resource. The processor translates the normalized coordinates to texel coordinates in the one or more residency maps based on the offset and accesses, in response to the request, the one or more residency maps based on the texel coordinates to determine whether texture data indicated by the normalized coordinates is resident in the PRT resource.

21 Claims, 8 Drawing Sheets

Related U.S. Application Data continuation of application No. 16/263,986, filed on Jan. 31, 2019, now Pat. No. 10,540,802.

(56) References Cited

U.S. PATENT DOCUMENTS

| | | | |
|---|---|---|---|
| 2009/0102851 A1* | 4/2009 | Takemoto | G06T 15/04 345/582 |
| 2011/0157205 A1 | 6/2011 | Tao et al. | |
| 2012/0038657 A1 | 2/2012 | Grossman et al. | |
| 2012/0147028 A1 | 6/2012 | Frisinger | |
| 2015/0089146 A1 | 3/2015 | Gotwalt et al. | |
| 2016/0364900 A1* | 12/2016 | Seiler | G06T 11/001 |
| 2017/0329395 A1* | 11/2017 | Flordal | G06T 15/04 |
| 2018/0232940 A1* | 8/2018 | Goossen | G06T 15/04 |

OTHER PUBLICATIONS

International Search Report and Written Opinion dated May 18, 2020 for PCT/US20/14060, 9 pages.

Extended European Search Report dated Oct. 5, 2022 for 20747939.5, 14 pages.

Mayer, Albert Julian, 2010, "Virtual Texturing" (0126505) Masters Thesis. Technische Universitat Wien, Fakultat Fur Informatik, URL: https://www.cg.tuwien.ac.at/research/publications/2010/Mayer-2010-VT/.

Jurag Obert et al. "Virtual Texturing in Software and Hardware," ACM SIGGRAPH 2012 Courses (SIGGRAPH '12). Association for Computing Machinery, 2012, Article 5, pp. 1-29. https://doi.org/10.1145/2343483.234348.

* cited by examiner

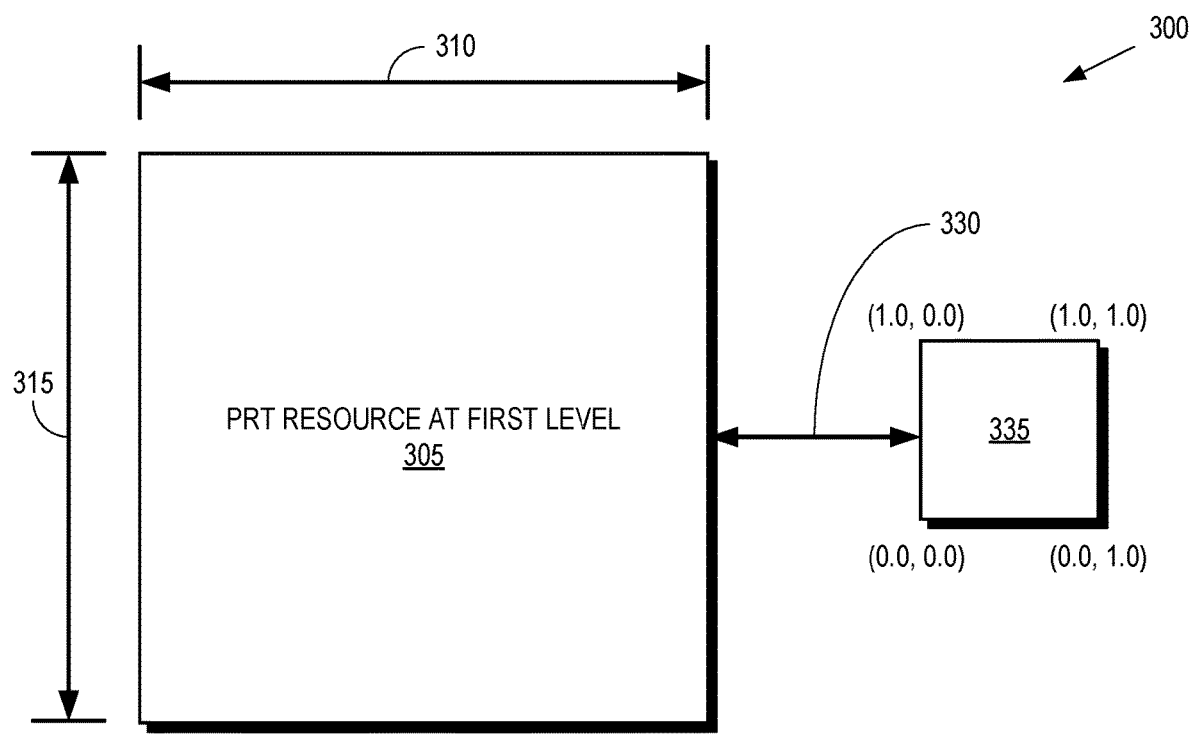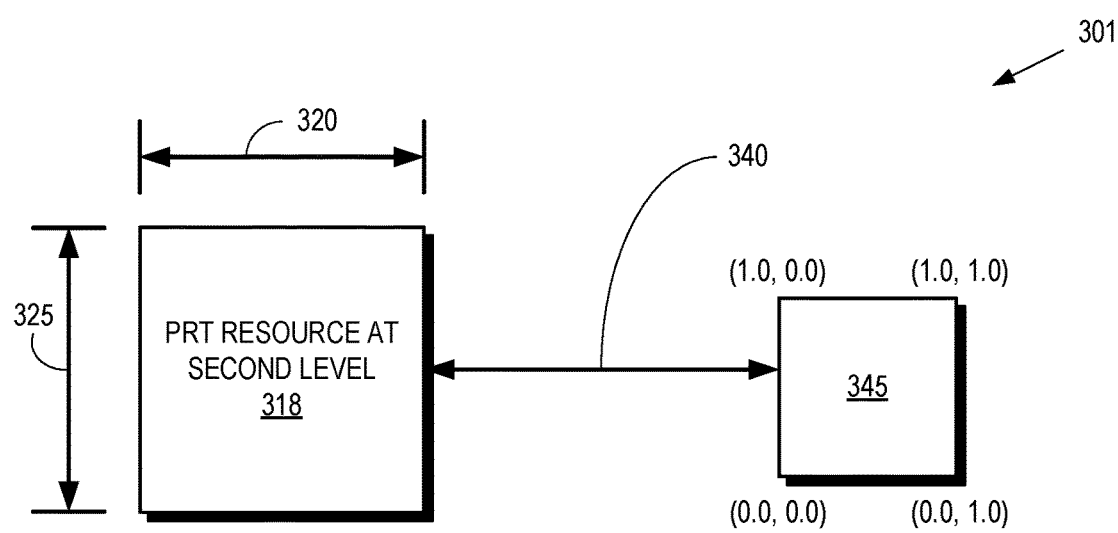
FIG. 3

RESIDENCY MAP DESCRIPTORS

CROSS-REFERENCE TO RELATED APPLICATIONS

The present application is a continuation application of U.S. application Ser. No. 16/723,232, entitled "RESIDENCY MAP DESCRIPTORS", and filed on Dec. 20, 2019, now issued as U.S. patent Ser. No. 10/991,146 B2, which is a continuation application of U.S. application Ser. No. 16/263,986, entitled "RESIDENCY MAP DESCRIPTORS", and filed on Jan. 31, 2019, now issued as U.S. Pat. No. 10,540,802 B1, the entirety of which is incorporated by reference herein.

BACKGROUND

A graphics processing unit (GPU) processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. The process includes mapping textures to the primitives to incorporate visual details that have a higher resolution than the resolution of the primitives. The GPU includes a dedicated memory that is used to store texture values so that the texture values are available for mapping to primitives that are being processed in the graphics pipeline. Textures can be stored on a disk or procedurally generated as they are needed by the graphics pipeline. The texture data stored in the dedicated GPU memory is populated by loading the texture from the disk or procedurally generating the data. The dedicated GPU memory is typically a relatively small memory, which limits the amount of texture data that can be stored in the dedicated GPU memory. Furthermore, the overhead required to populate the texture data can be significant, particularly if only a small subset of the texture data is used to render the final screen image.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 3 is a block diagram of translations between different levels of a partially resident texture (PRT) resource and normalized coordinate space according to some embodiments.

DETAILED DESCRIPTION

Figure 1:
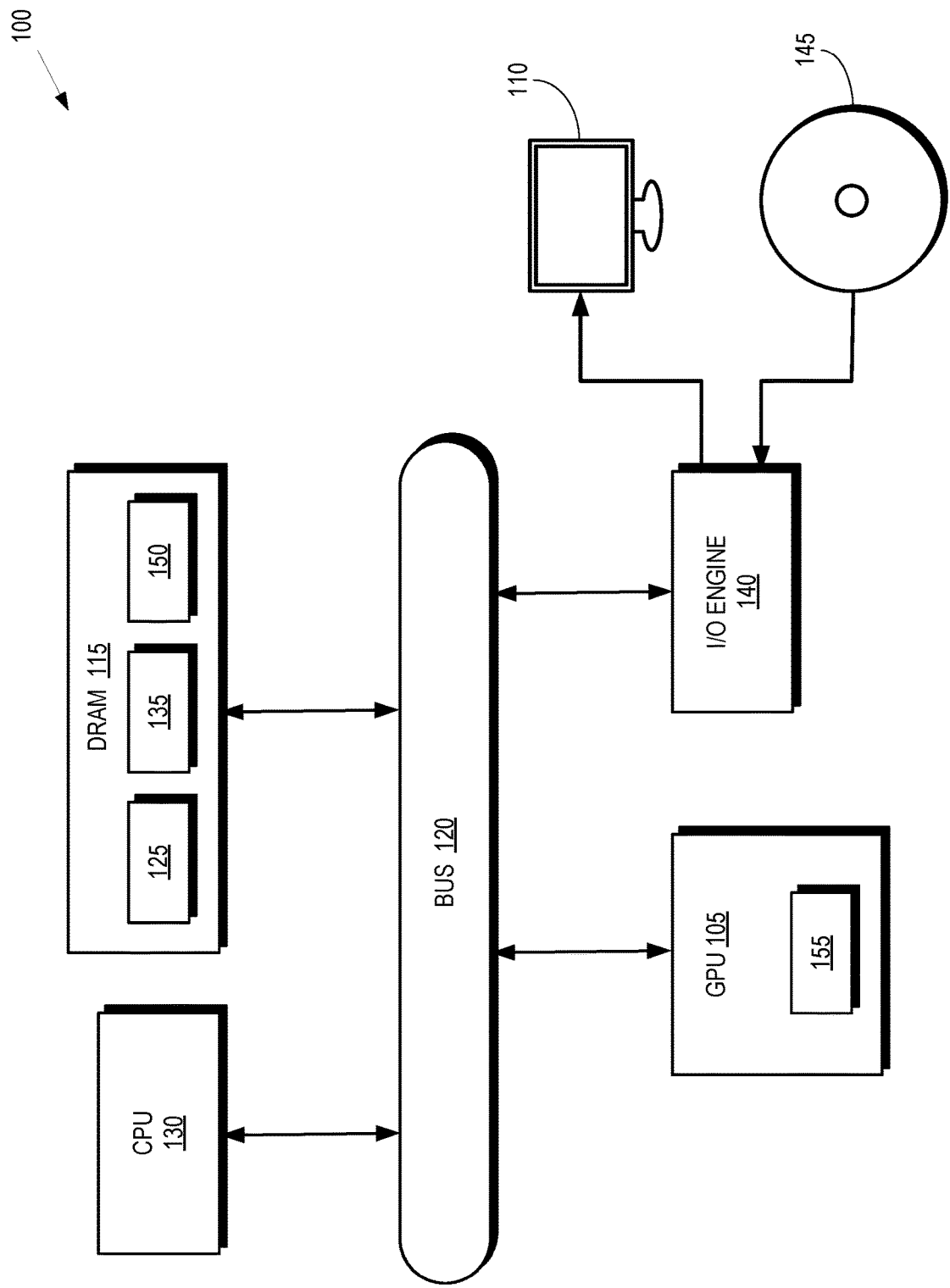
FIG. 1 is a block diagram of a processing system that includes a graphics processing unit (GPU) for creating visual images intended for output to a display according to some embodiments.

In some cases, texture information is stored at a GPU in a partially resident texture (PRT) resource using a hierarchical mipmap representation of the texture. Each level in the mipmap represents the texture at a level of detail (LOD). The standard convention is to decrease the LOD at higher levels of the mipmap, although the reverse level numbering could also be used. The dimensions of the PRT resource (in texel space) are reduced by a factor of two in each successively higher level. Shaders or applications use normalized texture coordinates to access the levels of the mipmap of the PRT resource. Normalized (u, v) texture coordinates are normalized from their actual dimensions (e.g., a range of 0 . . . dim-1) to a normalized range from 0.0 to 1.0.

Space in the dedicated GPU memory is conserved by populating a subset of the texels in the mipmap hierarchy so that texture information is not necessarily resident in all of the texels at all of the mipmap levels of the PRT resource. One drawback to storing the texture information in a PRT resource is that the texture hardware returns the color black in response to an application sampling a texel that is not resident in the dedicated GPU memory. This drawback is overcome by generating a residency map that indicates the finest LOD (or lowest mipmap level) that is populated in the PRT resource. For example, a texel in the residency map can indicate that corresponding texels in the PRT resource are resident at level 3 (and all higher levels/lower LODs) of the mipmap. The residency map uniformly divides normalized texture coordinate space according to the dimensions of the residency map. For example, a 2×2 residency map uniformly divides the normalized (u, v) texture coordinate space into four texels that respectively cover the (u, v) ranges (0.0 . . . 0.5, 0.0 . . . 0.5), (0.5 . . . 1.0, 0.0 . . . 0.5), (0.0 . . . 0.5, 0.5 . . . 1.0), and (0.5 . . . 1.0, 0.5 . . . 1.0). Thus, a single texel of the residency map carves out tiles that include different numbers of texels at different mipmap levels of the PRT resource, depending on the dimensions of the PRT resource at the sampled level of the mipmap.

A shader (or a corresponding application) samples the PRT resource using a sampling operation that includes the normalized (u, v) coordinates that indicate a sampling location the normalized (u, v) texture coordinate space. The normalized coordinates are converted into texel coordinates using the dimensions of the PRT resource at one or more mipmap levels. For example, if a requested mipmap level has dimensions of 8×8 texels, the normalized u-coordinate is converted to a texel coordinate by multiplying by (8−1)=7 and the normalized v-coordinate is converted to a texel coordinate by multiplying by (8−1)=7. The texel coordinates are then converted into addresses within the texel data and the addresses are used to fetch the texel data. However, as discussed above, not all of the texels are necessarily resident at all levels of the PRT resource. In order to prevent the texture hardware from returning a black texel in response to a request to access a non-resident texel, the residency map is sampled to identify the finest populated mipmap level of the PRT resource. Subsequent sampling of the PRT resource is clamped to this LOD so that a less detailed, but resident, texel value is returned instead of black when an application attempts to access a non-resident texel at a lower level/higher LOD of the mipmap. In some cases, the coordinate translation includes a step of generating additional positions in the normalized texture coordinate space that are subsequently translated into texel positions in texel space. In certain cases, such as anisotropic texture filtering, generating the additional positions and corresponding texel positions requires knowledge of the PRT resource dimensions in the texel space.

Translation of the normalized (u, v) coordinates to texel coordinates must be performed consistently for the PRT resource and the residency map. Incorrect identification of the texels in the residency map due to an incorrect coordinate translation could result in a PRT miss due to a miscalculated lowest mipmap level/highest LOD present at the sample position. The shader may then attempt to access a non-resident texel at a lower mipmap level/higher LOD, which could result in an unwanted visual artifact due to a black color being returned by the sampling operation. The coordinate translation between normalized (u, v) coordinates and texel coordinates in the residency map is performed based on the dimensions of the residency map. The coordinate translation between normalized coordinates and texel coordinates for the PRT resource is performed based on the dimensions of the accessed mipmap level of the PRT resource. The texture hardware must therefore know the dimensions of both the residency map and the PRT resource to ensure that the sampled texels in the residency map are correctly mapped to the texels that will be accessed during the PRT resource sampling operation. Consequently, the dimensions of the PRT resource and the dimensions of the residency map need to be conveyed to the texture hardware, thereby ensuring that the process of sampling the residency map reproduces the process of sampling the original PRT resource.

Texture descriptors are used to convey dimensions and other attributes to the texture hardware by encoding the information into a limited set of bits. Examples of attributes that are conveyed in texture descriptors includes pointers to the texture, dimensions of the PRT resource, data encoding formats, numbers of bytes per texel, compression ratios, compression type, and the like. The size of a texture descriptor is typically aligned to the word size of the machine, e.g., the texture descriptor can include 256 bits that align to 32 bit words or 64 bit words depending on the type of machine. Modifying the texture descriptor to convey the explicit dimensions of the PRT resource in addition to the dimensions of the residency map would require a substantial increase in the size of the texture descriptor, which would require significant changes in the texture pipeline including modifications to the request path from the shader to the texture hardware and any other hardware that receives the texture descriptor. For example, a conventional texture descriptor represents one dimension of a residency map using 16 bits and the texture typically includes three dimensions, for a total of 48 bits. Thus, increasing the size of the texture descriptor is not a practical way to convey the dimensions of the residency map to the texture hardware.

FIGS. 1-8 disclose embodiments of techniques that reduce the amount of information that is incorporated into a texture descriptor to indicate residency map dimensions by constraining the residency map dimensions to correspond to dimensions of a level of a hierarchical representation of a partially resident texture (PRT) resource. In some cases, the hierarchical representation is a mipmap. The residency map dimensions are determined based on a distance (or offset) in a mipmap space between the level of the residency map and a reference level such as the highest level of the PRT resource. The texture descriptor includes information that represents dimensions of the PRT resource, the offset between the reference level and the level of the residency map, and an address that points to the residency map. The offset indicates a number of levels between the reference level and the level of the residency map. The number of levels between the reference level and the residency map level indicates a ratio of the dimensions of the reference level and the residency map level. In some embodiments, the (u, v) dimensions of a level in the hierarchical representation each differ from the corresponding dimensions in adjacent levels of the hierarchical representation by a factor of two. An offset of two levels between the reference level and the residency map level would therefore indicate that the (u, v) dimensions of the reference level and the residency map level differ by a factor of four. Thus, the dimensions of the residency map are determined using the dimensions of the reference level and the ratio of the dimensions of the reference level and the level of the residency map indicated by the offset.

In response to receiving a request to sample the PRT resource, a sampling position in the residency map is determined by converting the normalized coordinates in the request to texel coordinates in the residency map using the dimensions of the residency map determined from the offset. Thus, both the PRT resource dimensions and the residency map dimensions can be conveniently derived from knowing PRT resource dimensions and the offset of the residency map in cases that require knowledge of both sets of dimensions. The texel coordinates of the sampling position are used to access a texel and the value of the texel indicates the lowest mipmap level/highest level of detail (LOD) that is resident in one or more corresponding texels of the PRT resource. A sampling position in the PRT resource is determined by mapping the normalized coordinate to texel coordinates in the PRT resource based on the dimensions of a mipmap level of the PRT resource, which are indicated in the texture descriptor. The texel coordinates in the PRT resource are used to access a texel in the mipmap level of the PRT resource. Accesses to the texel of the PRT resource are clamped to the LOD indicated by the value in the corresponding texel of the residency map. In some embodiments, the offset information is incorporated into previously unused bits of the texture descriptor so that the size of the texture descriptor remains the same.

FIG. 1 is a block diagram of a processing system 100 that includes a graphics processing unit (GPU) 105 for creating visual images intended for output to a display 110 according to some embodiments. The processing system 100 includes a memory 115. Some embodiments of the memory 115 are implemented as a dynamic random access memory (DRAM). However, the memory 115 can also be implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. The GPU 105 can execute instructions stored in the memory 115 and the GPU 105 can store information in the memory 115 such as the results of the executed instructions. For example, the memory 115 can store a copy 125 of instructions from a program code that is to be executed by the GPU 105. Some embodiments of the GPU 105 include multiple processor cores (not shown in the interest of clarity) that can independently execute instructions concurrently or in parallel.

The processing system 100 includes a central processing unit (CPU) 130 for executing instructions. Some embodiments of the CPU 130 include multiple processor cores (not shown in the interest of clarity) that can independently execute instructions concurrently or in parallel. The CPU 130 is also connected to the bus 120 and can therefore communicate with the GPU 105 and the memory 115 via the bus 120. The CPU 130 can execute instructions such as program code 135 stored in the memory 115 and the CPU 130 can store information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). Some embodiments of a draw call include information defining textures, states, shaders, rendering objects, buffers, and the like that are used by the GPU 105 to render the object or portion thereof. The GPU 105 renders the object to produce values of pixels that are provided to the display 110, which uses the pixel values to display an image that represents the included object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital video disc (DVD), and the like.

The external storage medium 145 stores information representative of program code used to implement an application such as a video game. The program code on the external storage medium 145 can be written to the memory 115 to form the copy 125 of instructions that are to be executed by the GPU 105 or the CPU 130. The external storage medium 145 also stores information representative of textures that are used to render images for presentation on the display 110. Portions of the textures stored on the external storage medium 145 are written to the memory 115, which stores this information as the texture information 150. Although the external storage medium 145 is depicted as a disk in FIG. 1, some embodiments of the external storage medium 145 are implemented as a server (or server cloud) that downloads or streams information to the processing system 100, e.g., via a wired or wireless communication link to the processing system 100.

The GPU 105 implements a graphics pipeline (not shown in FIG. 1 in the interest of clarity) that includes multiple stages configured for concurrent processing of different primitives or bins in response to a draw call. Stages of the graphics pipeline in the GPU 105 can concurrently process different primitives generated by an application, such as a video game. Processing of the primitives includes mapping textures to the primitives, e.g., to provide additional detail. The GPU 105 accesses texture data from the texture information 150 stored in the memory 115 or from a local memory 155 associated with the GPU 105. Texture data is stored in a partially resident texture (PRT) resource located in the memory 115 or the local memory 155. The PRT resource includes the texture data represented at different levels of detail (LOD) in different levels of a hierarchical representation of the texture, such as a mipmap representation of the texture. Texture data is not necessarily populated in all of the texels in the levels of the PRT resource prior to the GPU 105 requesting access to the texture data. For example, texture data may not have been written from the external storage medium 145 to the memory 115 or the local memory 155. For another example, the CPU 130 may not have procedurally generated the texture data in accordance with instructions in the program code 135.

The GPU 105 (or a shader or application executing on the GPU 105) accesses a residency map prior to, concurrently with, or as part of a request to access texture data from the PRT resource. Information in the residency map is used to determine whether the requested texture data is resident in the PRT resource. As discussed herein, the PRT resource represents the texture data as a hierarchical set of levels that represent a texture at different LOD, e.g., as a mipmap. Thus, the different levels of the PRT resource have different dimensions in texel space. Some embodiments of the residency map are constrained to have dimensions that correspond to one of the levels of the PRT resource. For example, the residency map can be represented as a 2×2 array of texels that corresponds to a level of the PRT resource that also includes a 2×2 array of texels that represents a texture at a relatively low LOD. The texels in the residency map include information indicating the lowest level (and highest LOD) of the PRT resource that includes resident texels encompassed by the corresponding texel of the residency map.

A request from the GPU 105 to access the PRT resource includes (or is associated with) normalized coordinates indicating a location in the texture. The normalized coordinates are referred to as (u, v) coordinates. The GPU 105 translates the normalized coordinates in the request to texel coordinates in the residency map using the dimensions of the residency map. The normalized coordinates are translated into the texel coordinates in the levels of the PRT resource based on dimensions of the levels of the PRT resource. The translations are performed such that the texture location indicated by the texel coordinates in the residency map is the same as a location indicated by texel coordinates in one or more levels of the PRT resource. The GPU 105 is therefore able to access information that indicates (or can be used to derive) dimensions of both the residency map and the levels of the PRT resource.

A texture descriptor includes the dimensions of one of the levels of the PRT resource and an offset between a reference level in the PRT resource and the level associated with the residency map. Some embodiments of the texture descriptor include dimensions of one of the levels of the PRT resource, such as the level having the highest LOD representation of the texture. Dimensions of other levels of the PRT resource are then determined based on a known relationship between the dimensions of the levels. For example, if the PRT resource is represented as a mipmap, dimensions of successive levels of the PRT resource increase or decrease by a factor of two. The texture descriptor also includes an offset between a reference level and the level of the PRT resource that matches the dimensions of the residency map. In some embodiments, the reference level is the same as the level that determines the dimensions of the PRT resource and the texture descriptor, e.g., the level having the highest LOD representation of the texture. Some embodiments of the texture descriptor include multiple offsets between the reference level and different dimensions in the residency map. For example, the texture descriptor can include three different offsets corresponding to three individual dimensions of the residency map.

The GPU 105 uses the information in the texture descriptor to translate the normalized coordinates of the request to texel coordinates in a level of the PRT resource using the dimensions of the PRT resource level and to translate the normalized coordinates to texel coordinates in the residency map using the offset included in the texture descriptor. The offset is used to determine dimensions of the residency map using the known dimensions of the reference level. In some embodiments, the offset indicates a number of levels between the reference level and the level of the residency map. The dimensions of the residency map are then determined based on the known dimensions of the reference level and a ratio of dimensions that is determined by the number of levels between the reference level and the level of the residency map. The processor translates the normalized coordinates to texel coordinates in the residency map based on the offset and, in response to the request, accesses the residency map based on the texel coordinates to determine whether texture data indicated by the normalized coordinates is resident in the PRT resource.

The GPU 105 uses the texel coordinates in the residency map to identify a texel in the residency map that corresponds to the requested access location in the PRT resource. A value of the texel in the residency map indicates the lowest level/highest LOD in the mipmap representation of the PRT resource that is populated by resident texels. The access request to the PRT resource is clamped to the level indicated by the value of the texel in the residency map. For example, the lowest level/highest LOD indicated in the request is constrained to be at the same or higher level (the same or lower LOD) as the lowest level/highest LOD indicated in the texel of the residency map. Clamping the access request in this manner ensures that the information returned in response to the access request is a representation of the texture and not a default black texel that is returned in response to attempts to access a non-resident texel in the PRT resource.

Figure 2:
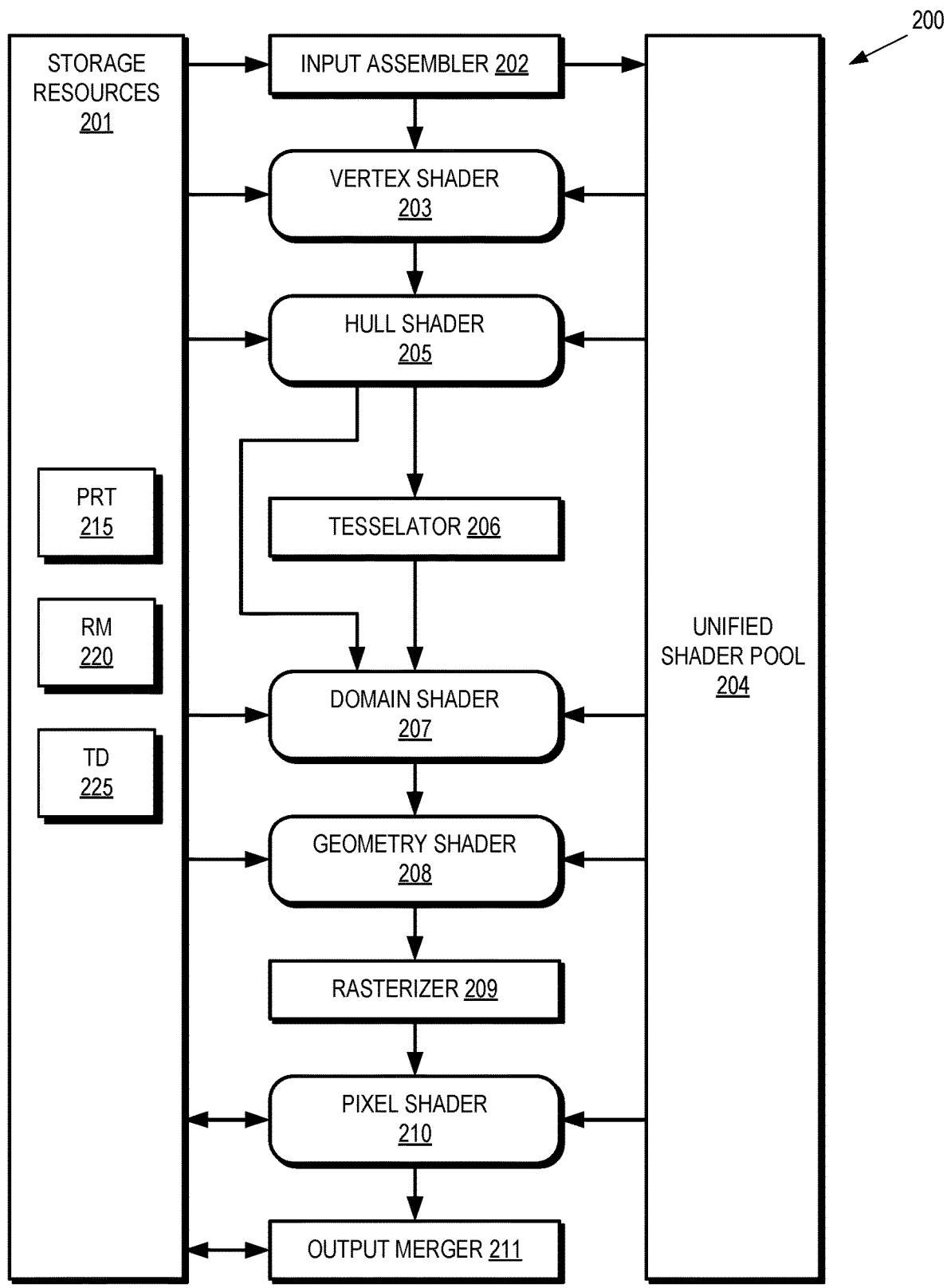
FIG. 2 depicts a graphics pipeline that is capable of processing high-order geometry primitives to generate rasterized images of three-dimensional (3D) scenes at a predetermined resolution according to some embodiments.

FIG. 2 depicts a graphics pipeline 200 that is capable of processing high-order geometry primitives to generate rasterized images of three-dimensional (3D) scenes at a predetermined resolution according to some embodiments. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is implemented in some embodiments of the GPU 105 shown in FIG. 1. The graphics pipeline 200 has access to storage resources 201 such as a hierarchy of one or more memories or caches that are used to implement buffers and store vertex data, texture data, and the like. The storage resources 201 can be implemented using some embodiments of the memory 115 shown in FIG. 1.

An input assembler 202 is configured to access information from the storage resources 201 that is used to define objects that represent portions of a model of a scene. A vertex shader 203, which can be implemented in software, logically receives a single vertex of a primitive as input and outputs a single vertex. Some embodiments of shaders such as the vertex shader 203 implement massive single-instruction-multiple-data (SIMD) processing so that multiple vertices can be processed concurrently. The graphics pipeline 200 shown in FIG. 2 implements a unified shader model so that all the shaders included in the graphics pipeline 200 have the same execution platform on the shared massive SIMD compute units. The shaders, including the vertex shader 203, are therefore implemented using a common set of resources that is referred to herein as the unified shader pool 204. Some embodiments of the unified shader pool 204 are implemented using processors in the GPU 105 shown in FIG. 1.

A hull shader 205 operates on input high-order patches or control points that are used to define the input patches. The hull shader 205 outputs tessellation factors and other patch data. Primitives generated by the hull shader 205 can optionally be provided to a tessellator 206. The tessellator 206 receives objects (such as patches) from the hull shader 205 and generates information identifying primitives corresponding to the input object, e.g., by tessellating the input objects based on tessellation factors provided to the tessellator 106 by the hull shader 205. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details can be added by tessellating the higher-order primitive.

A domain shader 207 inputs a domain location and (optionally) other patch data. The domain shader 207 operates on the provided information and generates a single vertex for output based on the input domain location and other information. A geometry shader 208 receives an input primitive and outputs up to four primitives that are generated by the geometry shader 208 based on the input primitive. One stream of primitives is provided to a rasterizer 209 and up to four streams of primitives can be concatenated to buffers in the storage resources 201. The rasterizer 209 performs shading operations and other operations such as clipping, perspective dividing, scissoring, and viewport selection, and the like. A pixel shader 210 inputs a pixel flow and outputs zero or another pixel flow in response to the input pixel flow. An output merger block 211 performs blend, depth, stencil, or other operations on pixels received from the pixel shader 210.

Some or all of the shaders in the graphics pipeline 200 can perform texture mapping using texture data that is stored in the storage resources 201. For example, the pixel shader 210 can read texture data from the storage resources 201 and use the texture data to shade one or more pixels. The shaded pixels are then provided to a display (such as the display 110 shown in FIG. 1) for presentation to a user. In the illustrated embodiment, texture data is stored in a PRT resource 215 that stores the texture data in a hierarchy of levels that represent the texture data at different LOD. For example, the PRT resource 215 can store the texture data as a mipmap that includes levels having dimensions that increase from level-to-level by a factor of two for each dimension. However, other level structures having other ratios of dimensions between levels are used in other embodiments. Not all of the texels at all of the levels of the PRT resource 215 are resident, i.e., include valid data representative of the texture. The resident texels in the PRT resource 215 are therefore indicated in a residency map (RM) 220. As discussed herein, normalized coordinates provided by shaders such as the vertex shader 203, the hull shader 205, the domain shader 207, the geometry shader 208, and the pixel shader 210 are translated to texel coordinates in the PRT resource 215 or the residency map 220. Translation is performed using information in a texture descriptor (TD) 225. The information in the texture descriptor 225 includes dimensions of a level of the PRT resource 215, an offset between a reference level and the level of the residency map 220, an address of the residency map 220 in the storage resources 201, and the like.

FIG. 3 is a block diagram of translations 300, 301 between different levels of a PRT resource and normalized coordinate space according to some embodiments. The translations are performed by some embodiments of the processing system 100 shown in FIG. 1 and the graphics pipeline 200 shown in FIG. 2. The PRT resource includes a hierarchy of levels that represent a texture at different LOD. A first level 305 of the PRT resource has a first dimension 310 and a second dimension 315 that are determined by the number of texels in the first level 305. For example, the dimensions 310, 315 in texel space can be 64 pixels and 64 pixels, respectively. The second level 318 of the PRT resource has a first dimension 320 and a second dimension 325 that are determined by the number of texels in the second level 318. For example, the dimensions 320, 325 can be 32 pixels and 32 pixels respectively.

Shaders, or applications running on the shaders, typically provide requests to access the PRT resource using normalized coordinates, which are referred to as (u, v) coordinates. The normalized coordinates are in the ranges u=0.0 ... 1.0 and v=0.0 ... 1.0. A translation 330 between the first level 305 in texel coordinates and the first level 335 in normalized coordinates is performed based on the dimensions 310, 315, e.g., using the translations:
U_texel=U_normalized*(width−1)
V_texel=V_normalized*(height−1)
where width is the dimension 310 measured in texels and height is the dimension 315 measured in texels. A translation 340 between the second level 318 in texel coordinates and the second level 345 and normalized coordinates is performed based on the dimensions 320, 325, e.g., replacing width with the dimension 320 and height with the dimension 325 in the above formulae.

Figure 4:
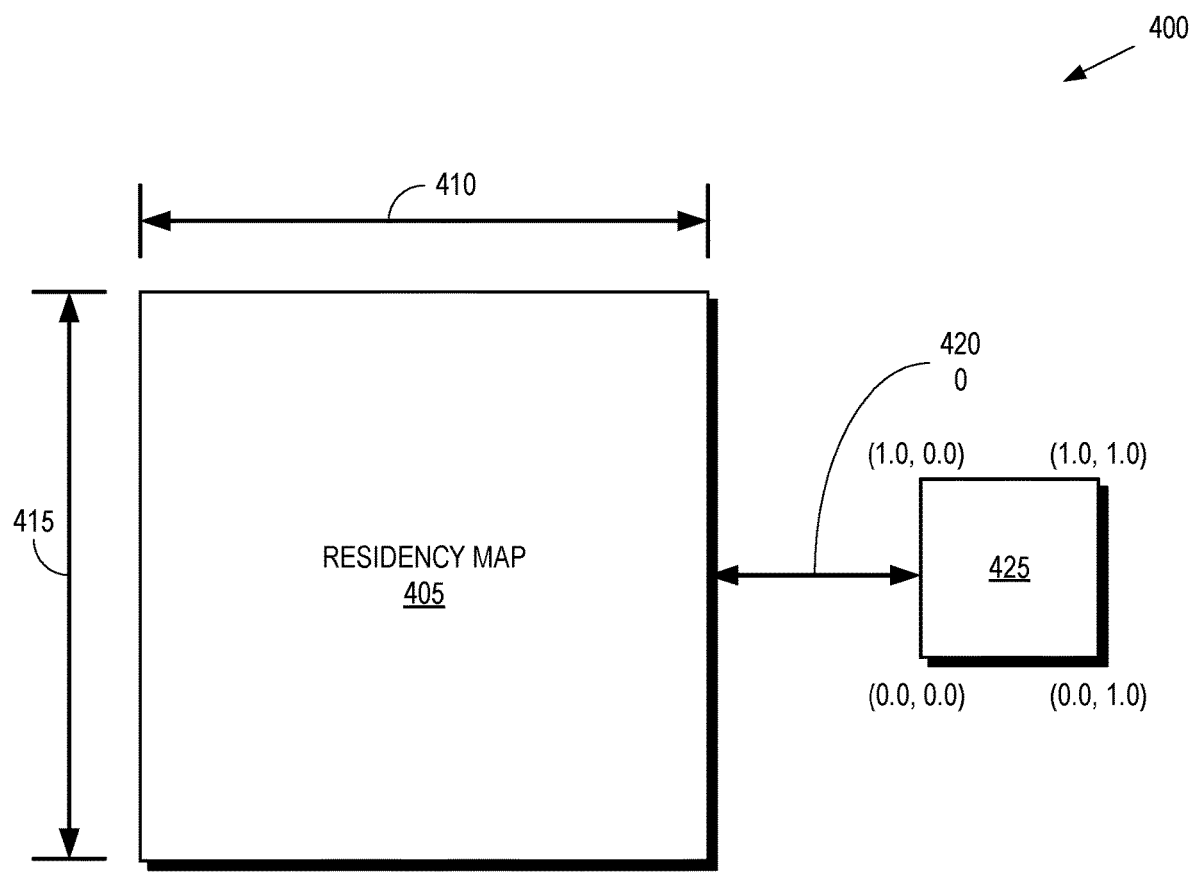
FIG. 4 is a block diagram of a translation between a residency map in texel space and normalized coordinate space according to some embodiments.

FIG. 4 is a block diagram of a translation 400 between a residency map 405 in texel space and normalized coordinate space according to some embodiments. The translation is performed by some embodiments of the processing system 100 shown in FIG. 1 and the graphics pipeline 200 shown in FIG. 2. The residency map 405 has a first dimension 410 and a second dimension 415 that are determined by the number of texels in the residency map 405. For example, the dimensions 410, 415 in texel space can be 2 pixels and 2 pixels, respectively. As discussed herein, requests to access a PRT resource associated with the residency map 405 include normalized coordinates, which are in the ranges u=0.0 ... 1.0 and v=0.0 ... 1.0. A translation 420 between the residency map 405 in texel coordinates and the residency map 425 in normalized coordinates is performed based on the dimensions 410, 415, e.g., using the translations:
U_texel=U_normalized*(width−1)
V_texel=V_normalized*(height−1)
where width is the dimension 410 measured in texels and height is the dimension 415 measured in texels. Texture hardware (such as processors implemented in the graphics pipeline 200 shown in FIG. 2) use the dimensions of the residency map 405 and the PRT resource at different levels (e.g., the levels 305, 318 shown in FIG. 3) to ensure that the normalized coordinates provided in an access request to a PRT resource refer to the same locations in the PRT resource at different levels (e.g., the levels 305, 318 shown in FIG. 3) and the residency map 405. As discussed herein, this information is provided in a texture descriptor.

Figure 5:
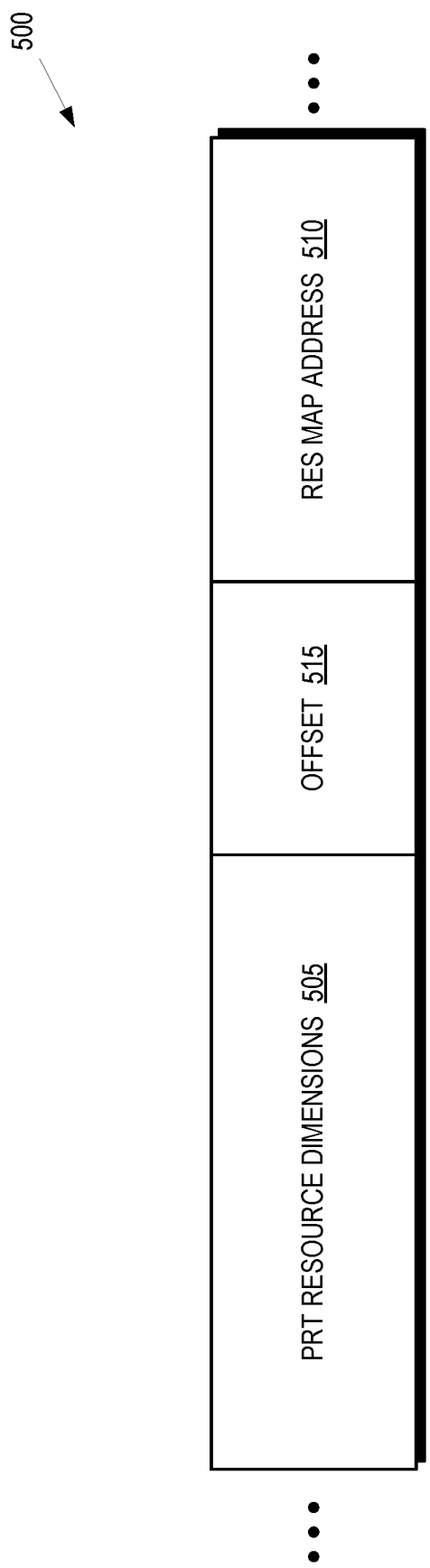
FIG. 5 is a block diagram of a texture descriptor according to some embodiments.

FIG. 5 is a block diagram of a texture descriptor 500 according to some embodiments. The texture descriptor 500 represents some embodiments of the texture descriptor 225 shown in FIG. 2. The texture descriptor 500 is aligned to the word size of a machine that uses the texture descriptor such as the GPU 105 shown in FIG. 1 and the graphics pipeline 200 shown in FIG. 2. For example, the texture descriptor 500 can include 256 bits that align to 32 bit words or 64 bit words depending on the type of machine.

The texture descriptor 500 includes information 505 representing dimensions of a level of a PRT resource. Some embodiments of the information 505 represent one dimension of the level of the PRT resource using 16 bits. If a texture includes three dimensions, the information 505 uses a total of 48 bits to represent the dimensions of the level of the PRT resource. In some embodiments, the information 505 represents the dimensions of a lowest level/highest LOD representation of a texture.

The texture descriptor 500 includes information 510 indicating an address of a residency map associated with the PRT resource. For example, the information 510 can indicate the address of the residency map 220 stored in the storage resources 201 shown in FIG. 2.

The texture descriptor 500 includes information 515 representing an offset that is used to derive dimensions of a residency map such as the residency map 220 shown in FIG. 2. The offset is used to derive the dimensions of the residency map based on the dimensions of a reference level such as the lowest level (having the highest LOD) of the PRT resource. In some embodiments, the offset indicates a number of levels between the reference level and the level of the residency map. The number of levels between the reference level and the residency map level indicates a ratio of the dimensions of the reference level and the residency map level. The dimensions of the residency map are therefore determined by a scaling or multiplying dimensions of the reference level by the ratio indicated by the offset. Representing the level of the residency map using the offset reduces the size of the texture descriptor 500. For example, the offset is represented using only three bits if the PRT resource is stored as a mipmap having eight levels.

Figure 6:
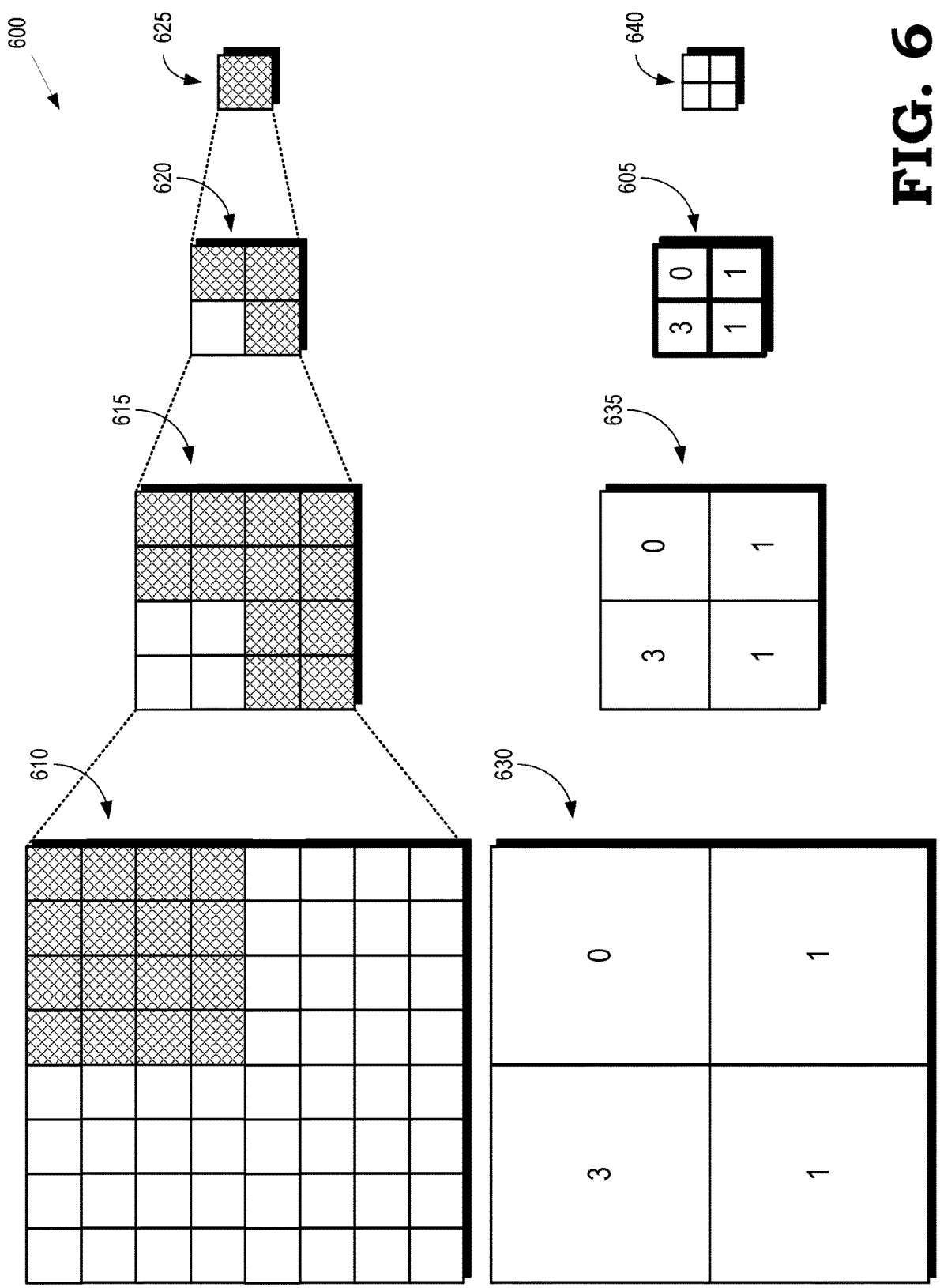
FIG. 6 is a block diagram of relationships between levels of a PRT resource and a residency map according to some embodiments.

FIG. 6 is a block diagram of relationships 600 between levels of a PRT resource and a residency map 605 according to some embodiments. The residency map 605 has dimensions of 2 texels by 2 texels. Values in the texels of the residency map 605 indicate the lowest level (corresponding to the highest LOD) of the PRT resource that includes a tile of resident texels that map to the corresponding texel in the residency map 605. The portion of the PRT resource illustrated in FIG. 6 includes a first level 610 that is given the level reference number 0, a second level 615 that is given the level reference number 1, a third level 620 that is given the level reference number 2, and a fourth level 625 that is given the level reference number 3. The levels 610, 615, 620, 625 are levels in a mipmap representation of the PRT resource and the dimensions of the levels 610, 615, 620, 625 increase or decrease by a factor of two in subsequent levels. For example, the level 610 has dimensions of 8 texels by 8 texels and the next subsequent level 615 has dimensions of 4 texels by 4 texels.

Translating the dimensions of the residency map 605 based on the information stored in the texture descriptor as discussed herein ensures that the boundaries of the texels in the residency map 605 correctly map to corresponding regions in the levels 610, 615, 620, 625. In the illustrated embodiment, the residency map 605 has the same dimensions as the level 620 of the PRT resource, e.g., 2 texels by 2 texels. Normalized coordinates in a request to access the PRT resource at the level 620 therefore refer to the same locations in the level 620 and the residency map 605.

Translating the dimensions as discussed herein ensures that the normalized coordinates also refer to the same locations in the other levels 610, 615, 625. For example, the texels in the translated version 630 of the residency map 605 correspond to the correct tiles of texels in the level 610, texels in the translated version 635 of the residency map 605 correspond to the correct tiles of texels in the level 615, and texels in the translated version 640 of the residency map 605 correspond to the correct tiles of texels in the level 625.

Crosshatched texels in the levels 610, 615, 620, 625 are resident in the PRT resource. In the illustrated embodiment, texels in the PRT resource corresponding to the upper left (e.g., texel coordinates 0, 0) of the residency map 605 are only resident at level 625 of the PRT resource. The value of the texel (0, 0) is therefore equal to the level reference number 3. Texels in the PRT resource corresponding to the upper right (e.g., texel coordinates 0, 1) of the residency map 605 are resident at level 610 of the PRT resource and higher levels/lower LOD. The value of the texel (0, 1) is therefore equal to the level reference number 0. Texels in the PRT resource corresponding to the lower left (e.g., texel coordinates 1, 0) of the residency map 605 are resident at level 615 of the PRT resource and higher levels/lower LOD. The value of the texel (1, 0) is therefore equal to the level reference number 1. Texels in the PRT resource corresponding to the lower right (e.g., texel coordinates 1, 1) of the residency map 605 are resident at level 615 of the PRT resource and higher levels/lower LOD. The value of the texel (1, 1) is therefore equal to the level reference number 1.

Figure 7:
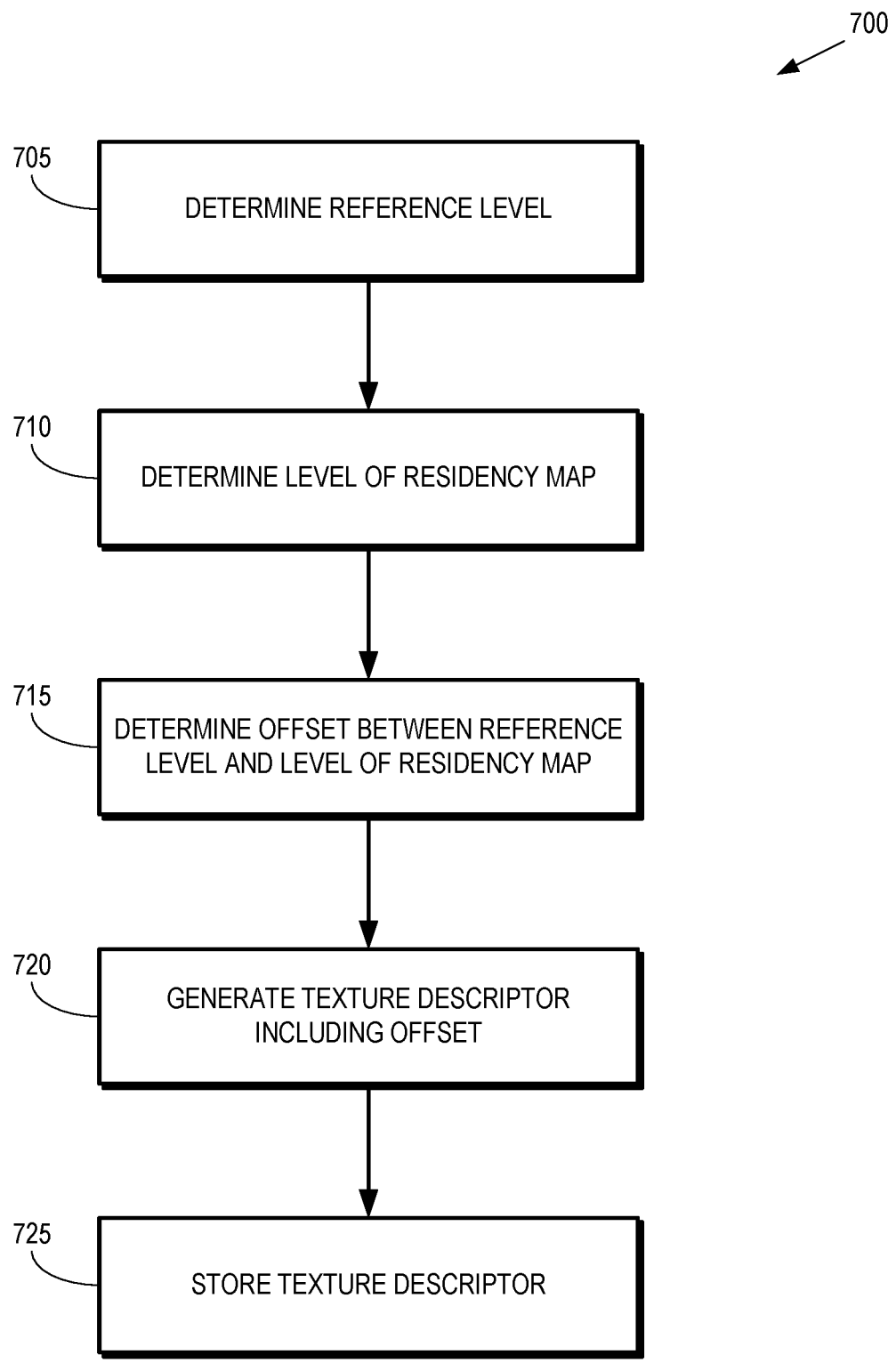
FIG. 7 is a flow diagram of a method of generating and storing texture descriptors according to some embodiments.

FIG. 7 is a flow diagram of a method 700 of generating and storing texture descriptors according to some embodiments. The method 700 is implemented in some embodiments of the GPU 105 shown in FIG. 1 and the graphics pipeline 200 shown in FIG. 2. For example, a driver implemented in the GPU 105 can be used to generate the texture descriptor. The method 700 is used to generate some embodiments of the texture descriptor 500 shown in FIG. 5. The texture descriptor includes information defining dimensions of a level in a hierarchy of levels of a PRT resource that represent a texture at different LOD. The texture descriptor is also associated with a residency map for the PRT resource.

At block 705, the driver determines a reference level that is used to determine an offset for a level of the residency map, which is constrained to have texel dimensions corresponding to one of the levels of the PRT resource. In some embodiments, the reference level is the lowest level/highest LOD in the hierarchy of levels of the PRT resource. The reference level is available to the driver, e.g., by storing a value that indicates the reference level in one or more registers, memory locations, buffers, and the like.

At block 710, the driver determines the level of the residency map. Information indicating the level of the residency map is available to the driver, e.g., as a value that is stored in one or more registers, memory locations, buffers, and the like.

At block 715, the driver determines an offset between the reference level and the level of the residency map. Some embodiments of the offset indicate a number of levels between the reference level and the level of the residency map. For example, if the reference level is level 0 of a mipmap representation of the texture and the level of the residency map corresponds to level 3 of the mipmap representation of the texture the value of the offset is 3.

At block 720, the driver generates a texture descriptor that includes the dimensions of the level of the PRT resource and the offset that represents the dimensions of the level of the residency map relative to the reference level. The number of bits required to represent the offset is much smaller than the number of bits required to directly represent the dimensions of the level of the residency map. For example, if one dimension of the level of the residency map is represented by 16 bits and a texture includes three dimensions, a total of 48 bits is needed to represent the dimensions of the level of the residency map. In contrast, only three bits are needed to represent the possible offsets of the level of the residency map if the number of levels in the hierarchical representation of the PRT resource is eight. In some embodiments, the driver includes information representing an address of the residency map to the texture descriptor, as well as additional information including pointers to the texture, dimensions of the PRT resource, data encoding formats, numbers of bytes per texel, compression ratios, compression type, and the like.

At block 725, the driver stores the texture descriptor in a memory location that is accessible to the shaders or applications that access the PRT resource and the residency map. For example, the texture descriptor can be stored in the memory 115 shown in FIG. 1 or the storage resources 201 shown in FIG. 2.

Figure 8:
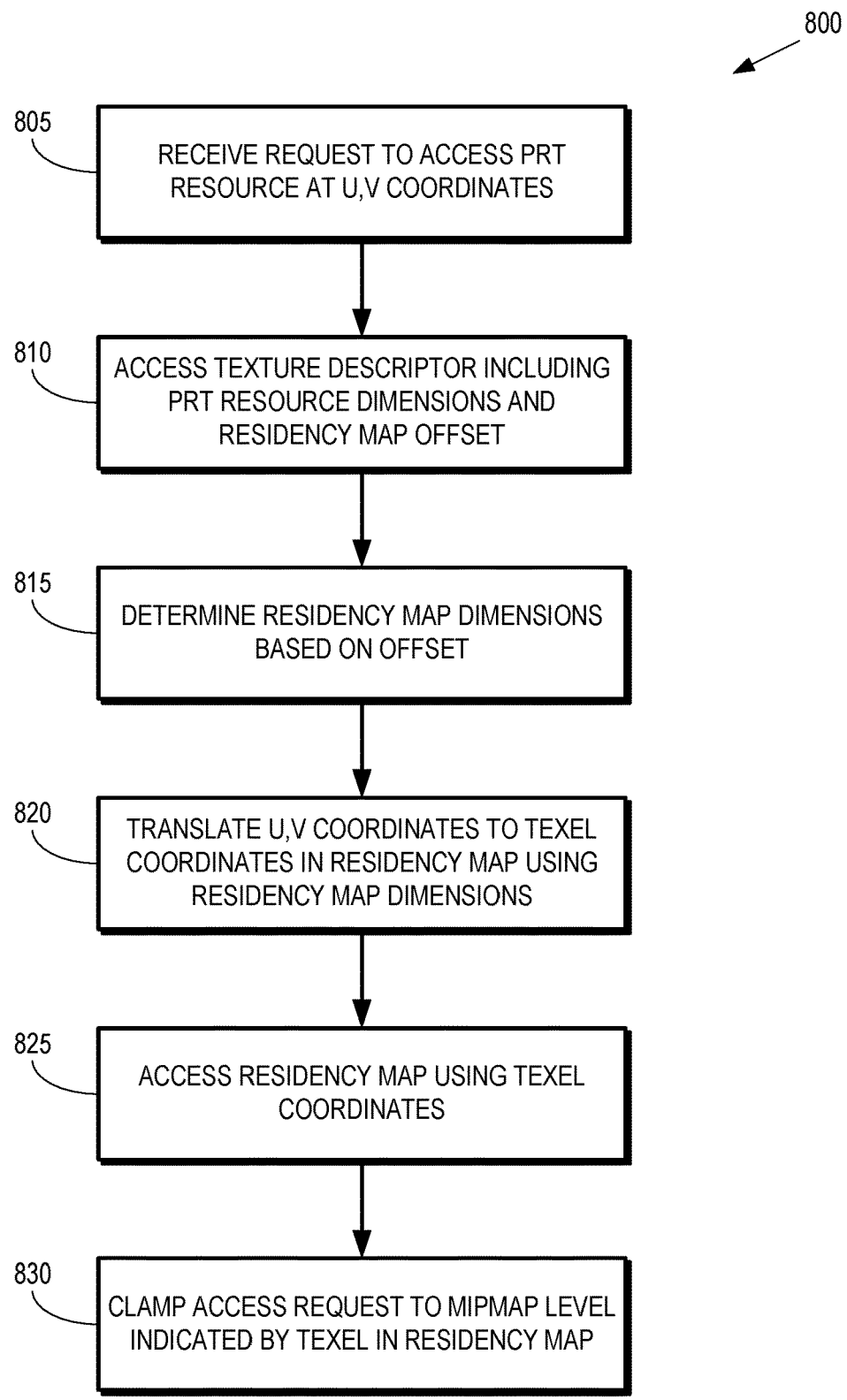
FIG. 8 is a flow diagram of a method of generating and storing texture descriptors according to some embodiments.

FIG. 8 is a flow diagram of a method 800 of generating and storing texture descriptors according to some embodiments. The method 800 is implemented by texture hardware such as circuitry in some embodiments of the GPU 105 shown in FIG. 1 and the graphics pipeline 200 shown in FIG. 2.

At block 805, the texture hardware receives a request to access one or more levels of the PRT resource. The request includes (or is associated with) normalized coordinates that indicate a location in the texture that is represented by the one or more levels of the PRT resource.

At block 810, the texture hardware accesses a texture descriptor associated with the PRT resource and a corresponding residency map. The texture descriptor includes information defining dimensions of the levels of the PRT resource and an offset that is used to determine the level of the residency map.

At block 815, the texture hardware determines dimensions of the residency map based on the offset. In some embodiments, the offset indicates a number of levels between the level of the residency map and a reference level. The number of levels indicates a ratio of dimensions of the residency map to the dimensions of the reference level. The texture hardware therefore determines the dimensions of the residency map by scaling (or multiplying) the dimensions of the reference level by the ratio indicated by the offset. In some embodiments, there are individual offsets for multiple different residency map dimensions (e.g., three offsets), and texture hardware determines the dimensions of the residency map by applying separate individual offsets to the reference level.

At block 820, the texture hardware translates the normalized coordinates from the request to texel coordinates in the residency map using the dimensions of the residency map. In some embodiments, the translation is performed as illustrated in FIG. 4.

At block 825, the texture hardware accesses the residency map using the texel coordinates. For example, the texture hardware identifies a texel in the residency map based on the texel coordinates that are translated from the normalized coordinates in the request. The texel includes information that indicates the lowest level/highest LOD in the PRT resource that includes resident texels that represent the texture. In some embodiments, the information in the texel indicates the lowest level of a mipmap that includes resident texels for the portion of the texture in the PRT resource that is encompassed by the boundaries of the texel in the residency map.

At block 830, the access request is clamped to the PRT resource level that is indicated in the texel of the residency map. In some embodiments, the access request is clamped to a level by constraining the access request to only access levels of the PRT resource that are the same as or higher (at a lower LOD) than the level indicated in the texel of the residency map. The request is then submitted to the PRT resource. Clamping the request ensures that request is accessing a portion of the PRT resource that is resident so that the PRT resource returns information representative of the texture at the requested location instead of returning the default black value for a non-resident texel.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
translating normalized coordinates of a request to access a partially resident texture (PRT) resource comprising a plurality of levels representing a texture at different levels of detail (LOD) to texel coordinates in the PRT resource based on a texture descriptor comprising information that represents dimensions of a first level of the plurality of levels and a residency map that indicates texels that are resident in the PRT resource; and
accessing the PRT resource based on the texel coordinates and the residency map.

2. The method of claim 1, wherein
the texture descriptor further comprises information that represents an offset between the first level and a second level of the plurality of levels; and
the first level corresponds to one of the plurality of levels that has a highest LOD among the plurality of levels.

3. The method of claim 2, wherein the offset indicates a number of levels between the second level and the first level.

4. The method of claim 3, further comprising:
translating the normalized coordinates to texel coordinates in the residency map based on the offset, wherein translating the normalized coordinates to the texel coordinates comprises determining dimensions of the residency map based on a ratio of the dimensions of the residency map to dimensions of the first level based on the number of levels between the second level and the first level.

5. The method of claim 4, wherein translating the normalized coordinates to the texel coordinates comprises translating the normalized coordinates to the texel coordinates based on the dimensions of the residency map.

6. The method of claim 4, further comprising:
translating the normalized coordinates to texel coordinates in the at least one of the plurality of levels of the PRT resource based on the dimensions of the first level of the plurality of levels, wherein the texel coordinates in the residency map indicate the same location as the texel coordinates in the at least one of the plurality of levels of the PRT resource.

7. The method of claim 1, wherein the texture descriptor comprises information that represents a plurality of offsets between the first level and a plurality of second levels associated with a plurality of residency maps.

8. The method of claim 1, further comprising:
identifying a texel in the residency map based on coordinates of the texel in the residency map; and
accessing information indicating a highest LOD that is resident in a tile of the PRT resource that corresponds to the texel in the residency map.

9. The method of claim 8, further comprising:
in response to the request, receiving texture data having an LOD that is less than or equal to the highest LOD that is resident in the tile.

10. An apparatus comprising:
a processor coupled to a memory that stores:
  a residency map indicating whether a texel is resident in a partially resident texture (PRT) resource comprising a plurality of levels, wherein the plurality of levels represent a texture at different levels of detail (LOD); and
  a texture descriptor comprising information that represents dimensions of a first level of the plurality of levels and the residency map, wherein
the processor configured to:
  receive a request to access at least one of the plurality of levels of the PRT resource, wherein the request includes normalized coordinates indicating a location in the texture; and
  translate the request to texel coordinates of a resident texel of the PRT resource based on the texture descriptor.

11. The apparatus of claim 10, further comprising the memory coupled to the processor.

12. The apparatus of claim 10, wherein
the texture descriptor further comprises information that represents an offset between the first level and a second level of the plurality of levels; and
the first level corresponds to one of the plurality of levels that has a highest LOD among the plurality of levels.

13. The apparatus of claim 12, wherein the texture descriptor comprises information that represents a plurality of offsets between the first level and a plurality of second levels associated with a plurality of residency maps.

14. The apparatus of claim 12, wherein the offset indicates a number of levels between the second level and the first level.

15. The apparatus of claim 14, wherein the processor is configured to determine dimensions of the residency map based on a ratio of the dimensions of the residency map to dimensions of the first level based on the number of levels between the second level and the first level.

16. The apparatus of claim 15, wherein the processor is configured to translate the normalized coordinates to coordinates of the texel based on the offset and the dimensions of the residency map.

17. The apparatus of claim 15, wherein the processor is configured to translate the normalized coordinates to texel coordinates in the at least one of the plurality of levels of the PRT resource based on the dimensions of the first level of the plurality of levels, wherein the coordinates of the texel in the residency map indicate the same location as the coordinates of the texel in the at least one of the plurality of levels of the PRT resource.

18. The apparatus of claim 10, wherein the processor is configured to identify a texel in the residency map based on the texel coordinates in the residency map and access information indicating a highest LOD that is resident in a tile of the PRT resource that corresponds to the texel in the residency map.

19. The apparatus of claim 18, wherein the processor is configured to receive, in response to the request, texture data having an LOD that is less than or equal to the highest LOD that is resident in the tile.

20. A method comprising:
identifying, at a processor, an offset between a first level of a plurality of levels of a partially resident texture (PRT) resource indicated by a residency map and a second level of the plurality of levels, wherein the plurality of levels represent a texture at different levels of detail (LOD), wherein the first level indicates which of the plurality of levels of the PRT resource are resident in a memory associated with the processor; and
storing a texture descriptor comprising information that represents dimensions of the first level of the plurality of levels and the offset.

21. The method of claim 20, wherein the texture descriptor comprises information that represents a plurality of offsets between the first level and a plurality of second levels associated with a plurality of residency maps, wherein the offset indicates a number of levels between the second level and the first level, wherein the first level corresponds to one of the plurality of levels that has a highest LOD among the plurality of levels.

* * * * *